R. W. SAMPSON.
TIRE PLUG.
APPLICATION FILED FEB. 5, 1916.
1,215,582.
Patented Feb. 13, 1917.
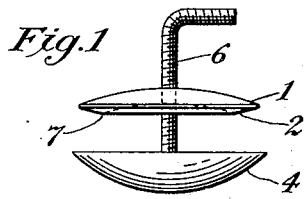
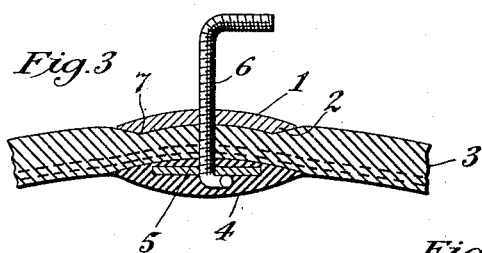
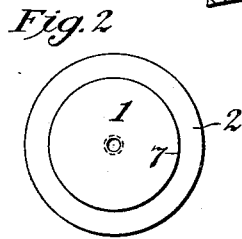
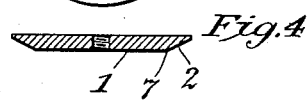
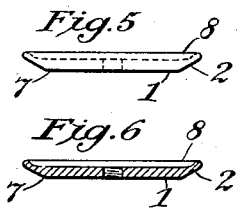
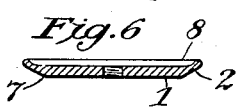
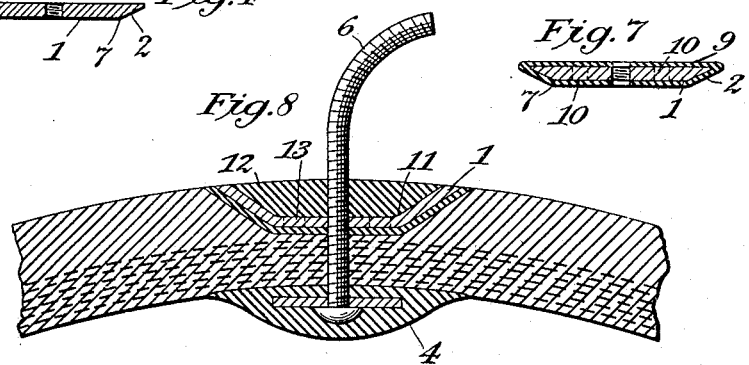
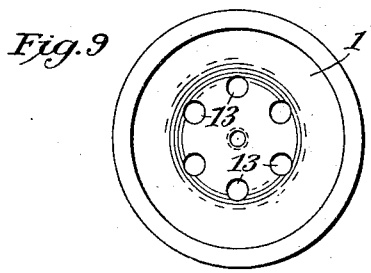
Inventor
Robert W. Sampson
By his Attorney
Andrew Wilson.

UNITED STATES PATENT OFFICE.

ROBERT W. SAMPSON, OF MELBA, WHITESTONE, NEW YORK, ASSIGNOR OF ONE-HALF TO LOUIS SCHWAB, OF EAST ORANGE, NEW JERSEY.

TIRE-PLUG.

1,215,582.  Specification of Letters Patent.  Patented Feb. 13, 1917.

Application filed February 5, 1916. Serial No. 76,272.

*To all whom it may concern:*

Be it known that I, ROBERT WILLIAM SAMPSON, a subject of the King of Great Britain, residing at Melba, Whitestone, Long Island, New York, have invented certain new and useful Improvements in Tire-Plugs, of which the following is a specification.

My invention relates to improvements in tire plugs or closers for repairing punctures in pneumatic tires, and more particularly to that class of such closers wherein a head carried by a threaded shank is clamped in place within the tire by a coöperating, screw-threaded cap. And the particular object of my present improvement is to so construct the coöperating cap as to minimize the danger of its cutting into and injuring the fabric of the tire against which it is clamped into place.

In the drawings Figure 1 is an elevation of a plug embodying my improved cap; Fig. 2 is a view of the under side of the cap; Fig. 3 is a vertical sectional view of a plug embodying my improved cap clamped into place in a section of a bicycle tire; Fig. 4 is a cross sectional view of a modified form of the cap; Fig. 5 is an edge view of another modification; Fig. 6 is a cross sectional view of the same; Fig. 7 is a cross sectional view of another modification, showing the cap provided with a rubber or similar covering; Fig. 8 is a vertical sectional view of a modified form of my cap embodied in a plug which is clamped into a section of an automobile tire; and Fig. 9 is a top view of the metal cap shown in Fig. 8, the rubber filling and covering being omitted.

Similar reference numerals designate similar parts in all the figures.

As is well understood in the art, in repairing punctures in pneumatic tires, the sealing operation, in order to be successful, must take place upon the inner surface of the tire, so that the compressed air is prevented from escaping past the inner sealing member or head of the puncture closer, and into the fabric of the tire, through which it will quickly work its way deflating the tire. And when the head of such a plug is clamped into position by means of a threaded shank and a coöperating nut-like cap, the cap will be bedded down, more or less, according to the pressure exerted, into the outer face of the tire, gripping the material of the tire between the cap and the stiff central portion of the head. Thus, between the head and the cap of the plug the material of the tire is compressed, while beyond the periphery of the cap it expands to its normal proportions. And if the outer edge of the cap presents a sharp or prominent angle against the material of the tire at the point where the latter is relieved from the pressure of the cap, there is a strong tendency, when the tire is in active use upon the road, for the cap to cut into and rupture the material of the tire, and thus destroy the value of the repair. And it is with the object of avoiding these difficulties and drawbacks that I have devised my improved plug.

In carrying out my invention for use with bicycle tires, I preferably use a cap 1, made of suitable metal, and either slightly concavo convexed, as shown in Figs. 1 and 2, or flat, as shown in Figs. 4 and 7, or provided with a slightly up-turned edge, as shown in Figs. 5 and 6. The under side of this cap 1 is sloped back as at 2, so as to form a comparatively gentle bevel, merging with the back of the cap at an obtuse angle or curve.

When such a cap, 1, is applied to a punctured tire 3 by means of a rubbered head 4 suitably stiffened, as by a metallic plate 5, and a coöperating threaded shank 6, the beveled edge of the cap will present a gradually diminishing pressure against the outer face of the tire 3, while the yielding periphery of the head will present a gradually diminishing resistance against the inner face of the tire. And, in consequence of this, the tire, instead of expanding abruptly around the outside of the edge of the cap, will gradually pass from its condition of extreme compression between the central portion of the cap and the stiffened portion of the head to its normal size at the periphery of the cap.

And when a tire thus repaired is used upon the road, the overhanging bevel 2 of the cap will prevent the angle or line of union 7 between the bevel and the lower face of the cap, from cutting into the material of the tire; and as the tire is relieved from the gripping pressure as it approaches and passes the circumference of the cap the danger of the cap cutting into and injurying the outer face of the tire will be reduced to a minimum, while the efficiency of the repair will not be impaired.

In Figs. 5 and 6 I have shown the edge of the cap as rounded over into a bead 8, which, under certain circumstances, may be a desirable modification. And in Fig. 7 I have shown the cap as covered by a coating of rubber 9, which may be more firmly secured thereto by being molded through perforations 10, 10 indicated by broken lines. In Fig. 8 I have shown a modification adapted for use with automobile tires. In this form the edge of the cap 1 is turned up on a gentle bevel so as to leave a considerable hollow 11 in its upper surface, which may receive a suitable filling as 12, of rubber or similar material, and which may be anchored through perforations 13, 13 to a rubber coating upon the lower face of the cap. This form of cap may be applied to repair a puncture in an automobile shoe by cutting away or removing part of the rubber facing of the shoe, to accommodate the cap, which should be then clamped down in close proximity to the fabric of the shoe by means of a suitable coöperating head 4 and shank 6, the rubbered lower face of the cap forming a close union with the rubber of the shoe, while the rubber filling 12 serves to restore, substantially, the contour of the face of the shoe.

It will be seen that in all these various forms the characteristic novel features of the cap, consisting in the gentle bevel beneath its outer edge, is preserved, so that the material of the tire or shoe is gradually released from the pressure of the repair, instead of being abruptly freed therefrom.

Having thus described my invention what I claim and desire to secure by Letters Patent of the United States is:—

1. A tire plug embodying an interior head, an exterior cap having a central portion of uniform thickness, a threaded hole therethrough, and a circumferential bevel on its lower side, and a coöperating shank threaded to engage the thread of the cap.

2. A tire plug embodying a head having a stiffened central portion and an elastic circumferential portion, a cap of a greater diameter than the stiffened central portion of the head and having a substantially uniform under surface opposed to the centrally stiffened portion of the head and a bevel extending therefrom to the circumference of the cap and opposed to the elastic circumferential portion of the head, and a coöperating clamping shank.

3. A tire plug embodying interior closing means, clamping means, and rigid, exterior, closing means adapted to exert a substantially uniform central pressure, and a gradually diminishing marginal pressure in opposition to the head when the closing means are clamped toward each other.

4. A tire plug embodying interior closing means having an extended, elastic, circumferential portion, clamping means, and rigid exterior closing means adapted to exert a pressure, in opposition to the elastic, circumferential portion of the head, gradually diminishing toward the periphery of the exterior closing means when the plug is clamped into a puncture.

5. A tire plug embodying an interior closing member provided with a rigid central element embedded in an elastic cushion, clamping means, and an exterior closing member adapted to exert a substantially uniform pressure in opposition to the rigid central element of the interior closing means, and to exert a gradually diminishing pressure beyond the periphery of said rigid element and in opposition to the surrounding portion of the elastic cushion.

ROBERT W. SAMPSON.

Witnesses:
HOWARD M. ROWE,
AGNES GERHAUSER.

Copies of this patent may be obtained for five cents each, by addressing the "Commissioner of Patents, Washington, D. C."